United States Patent [19]

Watanabe et al.

[11] Patent Number: 4,827,380

[45] Date of Patent: May 2, 1989

[54] ELECTRIC DOUBLE-LAYER CAPACITOR

[75] Inventors: Kouichi Watanabe; Yoshiaki Heinouchi, both of Kyoto, Japan

[73] Assignee: Murata Manufacturing Co., Ltd., Japan

[21] Appl. No.: 147,787

[22] Filed: Jan. 25, 1988

[30] Foreign Application Priority Data

Jan. 30, 1987 [JP] Japan .................................. 62-21453

[51] Int. Cl.$^4$ .............................................. H01G 9/00
[52] U.S. Cl. .................................... 361/502; 29/570.1
[58] Field of Search ............... 361/433, 328, 329, 330; 29/25.42, 570.1

[56] References Cited

U.S. PATENT DOCUMENTS

| | | | |
|---|---|---|---|
| 2,122,756 | 7/1938 | Schnoll | 361/433 |
| 3,333,165 | 7/1967 | Broadbent | 361/433 |
| 3,398,333 | 8/1968 | Zeppieri | 361/433 |
| 4,691,266 | 9/1987 | Yoshio | 361/433 |

FOREIGN PATENT DOCUMENTS

| | | | |
|---|---|---|---|
| 2307068 | 8/1974 | Fed. Rep. of Germany | 361/433 |
| 362146 | 7/1962 | Switzerland | 361/433 |

*Primary Examiner*—Donald A. Griffin
*Attorney, Agent, or Firm*—Ostrolenk, Faber, Gerb & Soffen

[57] ABSTRACT

An electric double-layer capacitor includes one or a group of electric double-layer capacitor element(s), an electrode structural member comprising of electrode plates and an insulating plate, stacked on the electric double-layer capacitor element(s), and a case for enclosing the electric double-layer capacitor element(s) and the electrode structural member. The case has a shelf-like stepped portion in the inner peripheral surface of its side wall. The shelf-like stepped portion and the side wall of the case are in close contact with the peripheral edge portion of the insulating plate, in order to airtightly seal the case and the insulating plate. Each electrode plate has an electrode terminal outwardly extending from the opening end portion of the case.

22 Claims, 1 Drawing Sheet

ELECTRIC DOUBLE-LAYER CAPACITOR

BACKGROUND OF THE INVENTION

1. Field of the Invention

The present invention relates to an electric double-layer capacitor, and more particularly, it relates to an electric double-layer capacitor which has an improved structure for sealing an opening end portion of its case. It also relates to a copending, commonly assigned application, Ser. No. No. 048,220 filed May 11, 1987 and now U.S. Pat. No. 4,766,523 issued Aug. 23, 1988.

2. Description of the Prior Art

In a conventional electric double-layer capacitor which is hereinafter referred to as prior art example 1, a plurality of elements are generally stacked and integrated by a thermal contraction tube (heat-shrinkable tube) and an electrode structural member formed of electrode plates and an insulating plate is placed on the same. Such components are inserted in a case, an opening end portion of which is then caulked (crimped) and the outer peripheral portion thereof is covered by another thermal contraction-tube.

In another type of a conventional electric double-layer capacitor which is hereinafter referred to as prior art example 2, a crimped portion at an opening end of a can case is sealed by ultraviolet-setting resin or thermosetting resin in order to ensure air-tightness of the crimped portion of the case.

In the prior art example 1, however, the element structure may become swollen or softened or metal parts may be rusted by infiltration of an organic solvent or water, since the opening end portion of the can case is not sufficiently sealed. Further, because of the insufficient seal the electrolytic solution maybe volatilized to cause performance degradation, such as an increase in equivalent series resistance or a decrease in electrostatic capacity.

In the prior art example 2, inferiority in airtightness may be caused by a variation in the volume of the injected resin or inferior wetting of the same. Further, the injected resin may spread upwardly toward the free ends of the electrode terminals, to cause a problem in employment of the electric double-layer capacitor.

SUMMARY OF THE INVENTION

An object of the present invention is to provide an electric double-layer capacitor which can overcome the disadvantages of the prior art, such as inferior appearance and the installation problem caused by upward spreading of resin, and which can ensure airtight sealing.

The inventive electric double-layer capacitor comprises a single electri double-layer capacitor element, or a group of such elements, a structural electrode member comprising electrode plates and an insulating plate placed on the electric double-layer capacitor element(s), and a case for containing the electric double-layer capacitor element(s) and the electrode structural member. The case is provided on the inner peripheral surface of its side wall, with a shelf-like stepped portion, which is brought into close contact with the peripheral edge portion of the insulating plate in order to airtightly form a seal between the case and the insulating plate. Each of the electrode plates has an electrode terminal extends from each of the electrode plates and projects outwardly from an opening end portion of the case.

Preferably, the opening end portion of the case is curled radially inward to hold the peripheral edge portion of the insulating plate between the opening end portion and the shelf-like stepped portion of the case.

The shelf-like stepped portion maybe formed by scraping the inner peripheral surface of the side wall of the case for example. Or, the shelf-like stepped portion maybe formed by annularly constricting the side wall surface of the case itself to project inwardly. Or, the shelf-like stepped portion maybe formed by reducing the thickness of only a portion close to the opening end portion of the case. Or, the shelf-like stepped portion may be formed by increasing the inner diameter of the portion close to the opening end portion of the case.

Further, a sealing agent is preferably applied to the upper surface of the shelf-like stepped portion. Preferably the insulating plate is formed from a material selected from a group of polyamide resin, fluorocarbon polymers and polypropylene resin filled with glass fiber. Preferably the electrode plates and the insulating plate are integrally formed by an insert molding method. For example, the case may be made of metal. The bottom surface of the case is, for example, in contact with the electric double-layer capacitor element(s) and thereby electrically connected with the same. For example, a pair of spaced-apart electrode plates maybe provided. One of the electrode plates, being closer to the electric double-layer capacitor element(s), is in contact with the electric double-layer capacitor element(s), and thereby electrically connected with the same. The other electrode plate is in contact with the opening end portion of the case, and thereby electrically connected with the same.

According to the aforementioned structure, the peripheral edge portion of the insulating plate and the shelf-like stepped portion etc. are readily brought into close contact with each other, to ensure airtight sealing. Thus, the case is prevented from infiltration of an organic solvent or water, which may be employed in a washing step after soldering of the electric double-layer capacitor to a circuit substrate, or if the capacitor is employed in proximity to water, whereby the elements are prevented from swelling/softening and the metal parts are prevented from rusting. Further, no volatilization of the electrolytic solution is caused even if the electric double-layer capacitor is subjected to a high temperature, whereby the electric double-layer capacitor is prevented from any increase in equivalent series resistance or decrease in electrostatic capacity.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
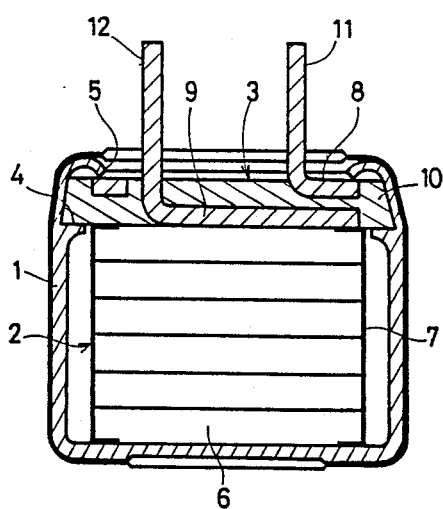
FIG. 1 is a longitudinal sectional view showing an electric double-layer capacitor according to the present invention.

FIG. 1 shows an electric double-layer capacitor according to an embodiment of the present invention, which has an upwardly opening cup-shaped metal case 1, an element group 2 contained in the metal case 1 and an electrode structural member 3 placed an and connected electrically to the element group 2. The metal case 1 has an inwardly projecting shelf-like stepped portion 4 in an upper part of the inner peripheral surface on its side wall. This shelf-like stepped portion 4 is formed by scraping the inner peripheral surface of the side wall of the metal case 1, for example. A part of the metal case 1 upwardly extending beyond the shelf-like stepped portion 4 is gradually reduced in diameter toward an opening end portion 5, which is curled in the inner peripheral direction.

The element group 2 in this example comprises six coaxially stacked elements 6, the outer peripheral surfaces of which are covered by a thermal contraction tube 7 to be integrated with each other. The lowermost end surface of the element group 2 is in contact with the bottom surface of the metal case 1, whereby the element group 2 is electrically connected with the metal case 1.

The electrode structural member 3, which is placed on the upper end surface of the element group 2, is formed by a pair of substantially discoidal electrode plates 8 and 9 and a discoidal insulating plate 10 for insulating the electrode plates 8 and 9. The electrode plates 8 and 9 are embedded in the insulating plate 10 to be parallel to each other, and the lower surface of the electrode plate 9, which is located in a lower position, is in contact with the upper end surface of the element group 2, to be electrically connected to the same. On the other hand, the upper electrode plate 8 is in pressure contact with the edge of the opening end portion 5 of the metal case 1, whereby the lowermost end surface of the element group 2 is electrically connected with the electrode plate 8 through the metal case 1. The electrode plates 8 and 9 are integrally provided with upwardly projecting electrode terminals 11 and 12 respectively. The electrode terminals 11 and 12 upwardly project from the insulating plate 10, to extend toward the exterior of the metal case 1.

The electrode structural member 3 is held between the opening end portion 5 of the metal case 1 and the upper end surface of the element group 2, while the lower surface of the outer peripheral portion of the insulating plate 10 is in pressure contact with the shelf-like stepped portion 4. Further, the outer peripheral edge portion of the insulating plate 10 is elastically in pressure contact with the inner peripheral surface of the side wall of the metal case 1. While the insulating plate 10 is originally adapted to electrically isolate the electrode plates 8 and 9 from each other, it also performs another function, in that the peripheral edge portion thereof is in pressure contact with the shelf-like stepped portion 4, to serve as a packing material for airtightly sealing the same.

The insulating plate 10 is prepared from a polyamide resin material, for example. It can be also prepared from fluorocarbon polymers capable of injection molding, polypropylene resin filled with glass fiber having high elasticity, or the like. The electrode plates 8 and 9 and the insulating plate 10 are integrally formed by an insert molding method. A sealing agent may be applied between the shelf-like stepped portion 4 and the insulating plate 10. Such a sealing agent may be prepared from epoxy resin, asphalt or silicon rubber, which is diluted by an organic solvent for application. Excellent airtightness can be obtained by employing the sealing agent.

A description is now made of method steps for assembling the electric double-layer capacitor of this embodiment.

Figure 2:
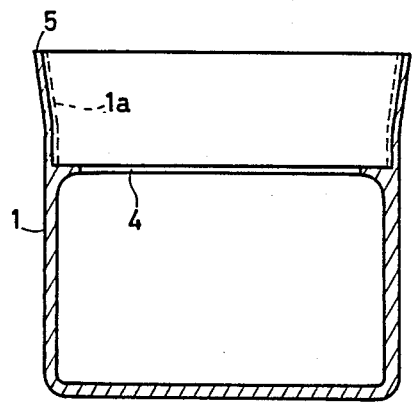
FIG. 2 is a longitudinal sectional view showing an example of a metal case.

An example of the metal case 1 employed in this embodiment is shown in FIG. 2. Referring to FIG. 2, a part of the metal case 1, which is closer to the opening end portion 5, is angled outwardly to be slightly spread toward the upper direction, for facilitating insertion of the electrode structural member 3 in assembling. The shelf-like stepped portion 4 is formed by scraping a part as shown by the broken line 1a through ordinary drawing. The metal case 1 can be easily formed by the ordinary drawing and ordinary forging which require only a small number of simple additional steps.

Figure 3:
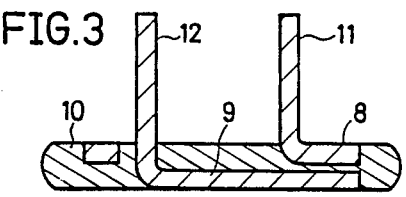
FIG. 3 is a longitudinal sectional view showing an example of an electrode structural member.

FIG. 3 shows the electrode structural member 3 state previous to insertion in the metal case 1. In this the outer peripheral edge portion of the insulating plate 10 has an outwardly projecting curved surface, and the diameter of the insulating plate 10 is set to be slightly larger than the inner diameter of the inner peripheral surface of the side wall of the metal case 1 as shown in FIG. 2.

The element group 2 is first inserted in the metal case 1 shown in FIG. 2, and then the electrode structural member 3 is inserted from above. Since the insulating plate 10 is slightly larger in diameter than the inner peripheral surface of the side wall of the metal case 1, the insulating plate 10 is inserted in the metal case 1 in a slightly compressed state. Then the opening end portion 5 of the metal case 1 is curled toward the inner peripheral direction, to bring the edge thereof into pressure contact with the upper surface of the electrode plate 8. Thus, the electrode plate 9 is brought into pressure contact with the upper surface of the element group 2, and the lower surface of the outer peripheral edge of the insulating plate 10 is brought into pressure contact with the shelf-like stepped portion 4. Consequently, the insulating plate 10 is brought into close contact with the shelf-like stepped portion 4 in an airtight sealing manner.

Figure 4:
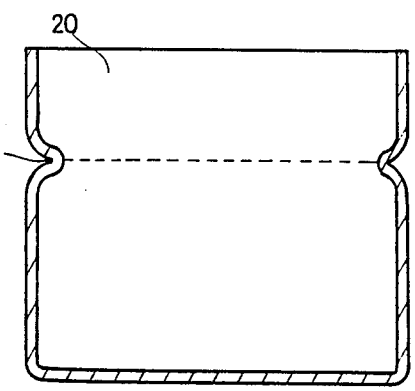
FIGS. 4, 5 and 6 are longitudinal sectional views showing other examples of the metal case respectively.
Figure 5:
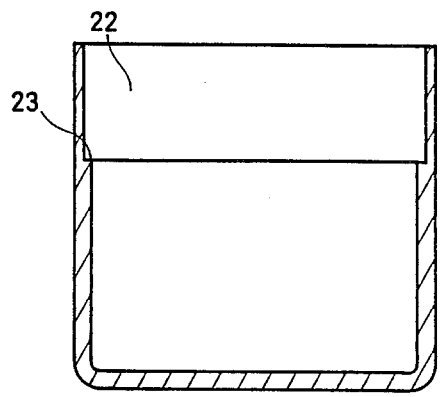
Figure 6:
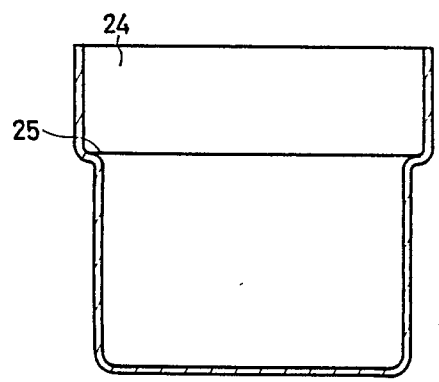

FIGS. 4 to 6 illustrate examples of metal cases which can be employed in place of the metal case 1 as shown in FIG. 2. In a metal case 20 as shown in FIG. 4, the side wall surface itself is annularly constricted to project inwardly, thereby to define a shelf-like stepped portion 21. In a metal case 22 as shown in FIG. 5, only an upper part thereof is reduced in thickness to define a shelf-like stepped portion 23. In a metal case 24 as shown in FIG. 6, an upper part is increased in inner diameter to define a shelf-like stepped portion 25.

The advantages of the above embodiment will now be described, with reference to Examples.

Example 1 was an electric double-layer capacitor employing the metal case 1 as shown in FIG. 2. Example 2 was an electric double-layer capacitor, essentially as same as Example 1, further comprising an adhesive agent applied to the shelf-like stepped portion 4. The adhesive agent was prepared from an asphalt solution diluted with benzene. Reference examples were the aforementioned prior art examples 1 and 2.

40 electric double-layer capacitors of 5.5 V in rated voltage and 0.047 F. were prepared for each of the Examples and reference examples, to evaluate the following items:

Visual Inspection: visual evaluation of appearance

Airtightness Inspection: inspection to detect insufficient airtightness and sealing against fluorocarbon liquid, i.e. fluorinert Evaluation of Volatile Loss of Electrolytic Solution: evaluation of reduction in weight after leaving the samples in a high-temperature state of 85° C. for 500 hours (average value of 20 samples)

TABLE 1

|  | Inferior Appearance | Insufficient Airtightness | Volatile Loss of Electrolytic Solution |
|---|---|---|---|
| Example 1 | 0/40 | 0/20 | 2.1 mg |
| Example 2 | 0/40 | 0/20 | 0.8 mg |
| Reference Example 1 | 0/40 | 20/20 | 6.8 mg |
| Reference Example 1 | 4/40 | 2/20 | 2.6 mg |

According to the inventive electric double-layer capacitor as hereinabove described, the shelf-like stepped portion is formed in the inner peripheral surface of the side wall of the case to be close contact with the peripheral edge portion of the insulating plate in an airtight sealing manner, so that upward spreading of resin toward the electrode terminals as in the prior art example 2 does not occur. Therefore, neither inferiority in appearance nor problems in employment are caused. Further, airtight sealing is ensured to prevent infiltration of a washing solution or water. In addition, volatile loss of the electrolytic solution after the electric double-layer capacitor is left under a high temperature is greatly reduced, whereby performance degradation can be neglected.

Although the present invention has been described and illustrated in detail, it is clearly understood that the same is by way of illustration and example only and is not to be taken by way of limitation, the scope of the present invention being limited only by the terms of the appended claims.

What is claimed is:

1. An electric double-layer capacitor comprising:
   electric double-layer capacitor means comprising at least a single electric double-layer capacitor element;
   an electrode structural member stacked on said electric double-layer capacitor means, said electrode structural member comprising a plurality of electrode plates and an insulating plate;
   a case containing said electric double-layer capacitor element and said electrode structural member; and
   means on an inner peripheral surface of a side wall of the case, including a shelf-like stepped portion which is in contact with a peripheral edge portion of said insulating plate, for forming an airtight seal between said case and said insulating plate, said shelf-like stepped portion being formed by a scraped portion of said inner peripheral surface of said side wall of said metal case near said opening end portion of said case;
   each of said electrode plates having an electrode terminal outwardly extending from an opening end portion of said case.

2. An electric double-layer capacitor in accordance with claim 1, wherein
   said opening end portion of said case is curled inwardly, so that said peripheral edge portion of said insulating plate is held between said opening end portion and said shelf-like stepped portion of said case.

3. An electric double-layer capacitor in accordance with claim 2, wherein
   a sealing agent is applied to the upper surface of said shelf-like stepped portion.

4. An electric double-layer capacitor in accordance with claim 3, wherein
   said sealing agent comprises a material selected from the group consisting of epoxy resin and silicon rubber.

5. An electric double-layer capacitor in accordance with claim 4, wherein
   said sealing agent is diluted by an organic solvent.

6. An electric double-layer capacitor in accordance with claim 1, wherein
   said insulating plate is prepared from a material selected from the group consisting of a polyamide resin, fluorocarbon polymers and polypropylene resin filled with glass fiber.

7. An electric double-layer capacitor in accordance with claim 6, wherein
   said electrode structural member is an integral unit,
   said electrode plates and said insulating plate being integrally formed by an insert molding method.

8. An electric double-layer capacitor in accordance with claim 7, wherein
   said case is made of metal,
   a bottom surface of the case is in contact with said electric double-layer capacitor element means and thereby electrically connected with the same,
   said electrode plates are a pair of electrode plates spaced from each other,
   one of said electrode plates, being closer to said electric double-layer capacitor means, is in contact with said double-layer capacitor means and thereby electrically connected with the same, and
   the other one of said electrode plates is in contact with said opening end portion of said case and thereby electrically connected with the same.

9. An electric double-layer capacitor in accordance with claim 6, wherein said insulating plate is prepared from polypropylene resin filled with glass fiber.

10. An electric double-layer capacitor in accordance with claim 1, wherein said capacitor means comprises a stacked plurality of said electric double-layer capacitor elements.

11. An electric double-layer capacitor in accordance with claim 10, wherein
    said stacked plurality of capacitor elements are enclosed within a heat-shrinkable tube to form an integrated assembly.

12. An electric double-layer capacitor in accordance with claim 1, wherein
    a peripheral edge of said insulating plate is press-fitted to the inner peripheral surface of the side wall of the case.

13. An electric double-layer capacitor in accordance with claim 12, wherein
    said opening end portion of said case is curled inwardly, so that said peripheral edge portion of said insulating plate is between said opening end portion and said shelf-like stepped portion of said case.

14. A method of assembling an electric double-layer capacitor comprising the steps of:
    providing at least one electric double-layer capacitor element;

providing an electrode structural member including a plurality of electrode plates spaced apart by an insulating plate;

providing a case for containing the electric double-layer capacitor element and said electrode structural member, and forming a shelf-like stepped portion on an inner peripheral surface of a side wall of the case by scraping said inner peripheral surface of said side wall of said metal case;

stacking said electrode structural element on said capacitor element in said case; and forming an airtight seal between said shelf-like stepped portion and said insulating plate to seal said case.

15. A method as in claim 14, further comprising:
forming a press-fit between said insulating plate and the inner peripheral surface of said side wall of said case.

16. A method as in claim 15, further comprising:
curling an opening end portion of said case inwardly to contact and secure said insulating plate between said opening end portion and said shelf-like stepped portion of said case.

17. A method as in claim 14, further comprising:
curling an opening end portion of said case inwardly to contact and secure said insulating plate between said opening end portion and said shelf-like stepped portion of said case.

18. A method as in claim 14, wherein
a sealing agent is applied to the upper surface of said shelf-like stepped portion.

19. A method as in claim 18, wherein
said sealing agent comprises a material selected from the group consisting of epoxy resin and silicon rubber.

20. A method as in claim 19, wherein
said sealing agent is diluted by an organic solvent.

21. A method as in claim 14, wherein
said electrode plates and said insulating plate are integrally formed by an insert molding method.

22. A method as in claim 21, wherein said insulating plate is prepared from polypropylene resin filled with glass fiber.

* * * * *